(12) United States Patent
Howard et al.

(10) Patent No.: US 8,470,930 B2
(45) Date of Patent: *Jun. 25, 2013

(54) NOVOLAK RESINS AND RUBBER COMPOSITIONS COMPRISING THE SAME

(75) Inventors: L. Scott Howard, New York, NY (US); Todd M. Aube, Schenectady, NY (US); Timothy Edward Banach, Glenville, NY (US); James J. Lamb, Duanesburg, NY (US)

(73) Assignee: SI Group, Inc., Schenectady, NY (US)

( * ) Notice: Subject to any disclaimer, the term of this patent is extended or adjusted under 35 U.S.C. 154(b) by 832 days.

This patent is subject to a terminal disclaimer.

(21) Appl. No.: 12/207,636

(22) Filed: Sep. 10, 2008

(65) Prior Publication Data

US 2009/0062472 A1 Mar. 5, 2009

Related U.S. Application Data

(63) Continuation of application No. 10/992,234, filed on Nov. 19, 2004, now Pat. No. 7,425,602.

(60) Provisional application No. 60/523,333, filed on Nov. 20, 2003.

(51) Int. Cl.
*C08G 65/38* (2006.01)
*C08G 14/04* (2006.01)

(52) U.S. Cl.
USPC ........... 525/132; 525/135; 525/136; 525/137; 525/390; 528/129; 528/153; 528/155; 528/212; 428/36.8

(58) Field of Classification Search
None
See application file for complete search history.

(56) References Cited

U.S. PATENT DOCUMENTS

| | | | |
|---|---|---|---|
| 2,566,851 A | 9/1951 | Novotny et al. | |
| 2,956,967 A | 10/1960 | Steckler | |
| 3,600,353 A | 8/1971 | Baker | |
| 3,784,515 A | 1/1974 | Freeman et al. | |
| 3,960,982 A | 6/1976 | Numata et al. | |
| 3,963,652 A | 6/1976 | Tanimura et al. | |
| 4,031,288 A | 6/1977 | Bhakuni et al. | |
| 4,040,999 A | 8/1977 | Kalafus et al. | |
| 4,167,500 A | 9/1979 | Jazenski et al. | |
| 4,167,540 A * | 9/1979 | Giller et al. | 525/135 |
| 4,383,005 A * | 5/1983 | Weil et al. | 428/625 |
| 4,465,807 A * | 8/1984 | Giller et al. | 525/135 |
| 4,542,186 A * | 9/1985 | Giller et al. | 525/138 |
| 4,631,322 A | 12/1986 | Isayama et al. | |
| 4,699,832 A * | 10/1987 | Sattelmeyer | 428/36.8 |
| 4,889,891 A | 12/1989 | Durairaj et al. | |

(Continued)

FOREIGN PATENT DOCUMENTS

| | | |
|---|---|---|
| EP | 0 545 445 A1 | 6/1993 |
| GB | 1 286 668 | 8/1972 |
| JP | 05-320293 A | 12/1993 |

OTHER PUBLICATIONS

Borve et al., "Preparation of High Viscosity Thermoplastic Phenol Formaldehyde Polymers for Application in Reactive Extrusion," Polymer, vol. 39, No. 26, pp. 6921-6927 (1998).

*Primary Examiner* — John J Figueroa
(74) *Attorney, Agent, or Firm* — Jeffrey N. Townes; LeClairRyan

(57) ABSTRACT

The present invention relates to novolak resins prepared with, inter alia, one or more alkylphenols. The invention further relates to compositions comprising the novolak resins, such as vulcanizable rubber compositions, and to products obtained therewith.

19 Claims, 7 Drawing Sheets

U.S. PATENT DOCUMENTS

| | | |
|---|---|---|
| 4,970,264 A | 11/1990 | Lindert et al. |
| 5,015,674 A | 5/1991 | Machida et al. |
| 5,026,762 A * | 6/1991 | Kida et al. .................... 524/495 |
| 5,030,692 A * | 7/1991 | Durairaj ........................ 525/134 |
| 5,075,414 A | 12/1991 | Dailey, Jr. |
| 5,089,589 A | 2/1992 | Hesse et al. |
| 5,206,289 A | 4/1993 | Sinsky et al. |
| 5,218,038 A | 6/1993 | Johnson et al. |
| 5,238,991 A | 8/1993 | Magnus et al. |
| 5,922,797 A | 7/1999 | Chu et al. |
| 5,936,056 A | 8/1999 | Durairaj et al. |
| 5,945,500 A | 8/1999 | Durairaj et al. |
| 6,448,318 B1 | 9/2002 | Sandstrom |
| 6,472,457 B1 | 10/2002 | Durairaj et al. |
| 6,828,383 B2 | 12/2004 | Durairaj et al. |
| 6,875,807 B2 | 4/2005 | Durairaj et al. |
| 7,425,602 B2 * | 9/2008 | Howard et al. ............... 528/129 |
| 2002/0055583 A1 | 5/2002 | Iizuka et al. |
| 2003/0134953 A1* | 7/2003 | Burkhart et al. .............. 524/322 |
| 2004/0116592 A1* | 6/2004 | Durairaj et al. ............ 524/575.5 |

\* cited by examiner

NOVOLAK RESINS AND RUBBER COMPOSITIONS COMPRISING THE SAME

RELATED APPLICATIONS

This application is a continuation of U.S. application Ser. No. 10/992,234, now U.S. Pat. No. 7,425,602, filed Nov. 19, 2004, and claims priority under 35 U.S.C. §119(e) to U.S. provisional application No. 60/523,333, filed Nov. 20, 2003, both of which of herein incorporated by reference in their entirety.

FIELD OF THE INVENTION

The present invention relates to novolak resins prepared with, inter alia, one or more alkylphenols. The invention further relates to compositions comprising the novolak resins, such as rubber compositions, and to products obtained therewith. Also, the present invention relates to a process for preparing a rubber composition.

BACKGROUND OF THE INVENTION

Resorcinol and resorcinol-formaldehyde resins have been used in the rubber industry in rubber compositions and adhesives. However, one of the problems associated with resorcinol and conventional resorcinol-formaldehyde based resins is the high fuming of these resins during rubber compounding. Accordingly, the art has seen several attempts to address this problem. See, e.g., U.S. Pat. Nos. 5,936,056 and 5,945,500. However, the need remains for a resin that has acceptable or no fuming levels yet still satisfactorily offers advantages that are provided by the conventional (fuming) resins.

Resorcinol resins and/or rubber compositions are mentioned in U.S. Pat. Nos. 4,031,288; 4,167,540; 4,889,891; 5,030,692; 5,206,289; 5,238,991; 5,922,797; 5,936,056; 5,945,500; 6,448,318; and 6,472,457. All eleven patents are hereby incorporated by reference in their entirety by reference.

SUMMARY OF THE INVENTION

The present invention provides novolak resins prepared with, relative to the total weight of phenolic monomers used in the preparation, 1-40 wt % of phenols having one or more alkyl groups; i.e., alkylphenois.

In one embodiment, the present invention provides novolak resins prepared by reacting:
 (a) 1-30 wt % of one or more alkylphenols;
 (b) 1-25 wt % of resorcinol;
 (c) 45-98 wt % © of phenol; and
 (d) one or more aldehydes;
wherein said wt % are relative to the total weight of components (a), (b), and (e).

Also, the present invention provides rubber compositions comprising the present novolak resins.

Furthermore, the present invention provides a process for preparing a rubber composition. In one embodiment, the process includes:
 (a) mixing one or more oils and one or more novolak resins to provide a novolak-oil composition; and
 (b) mixing the novolak-oil composition with one or more rubber compounds.

Additional aspects, advantages and features of the present invention are set forth in this specification, and in part will become apparent to those skilled in the art on examination of the following, or may be learned by practice of the invention.

The inventions disclosed in this application are not limited to any particular set of or combination of aspects, advantages and features. It is contemplated that various combinations of the stated aspects, advantages and features make up the inventions disclosed in this application.

DETAILED DESCRIPTION

Figure 1:
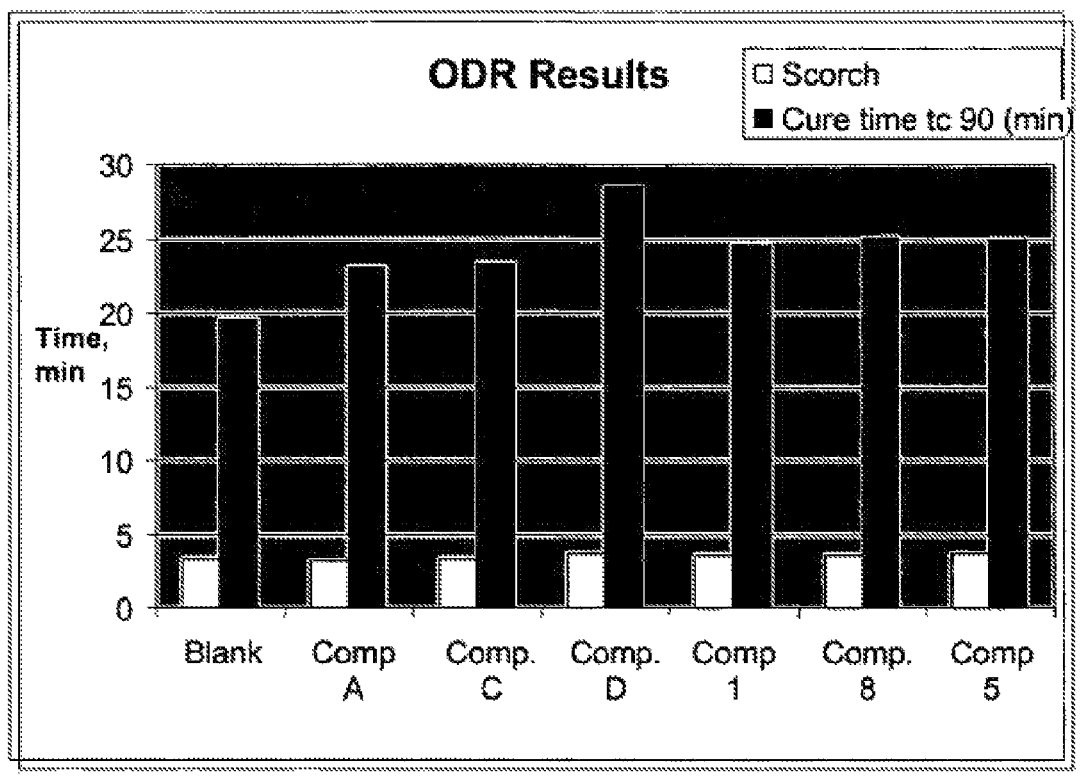
FIG. 1 depicts a chart of Oscillating Disk Rheometry test results analyzing compositions 1, 5, 8, A, C, and D.

The present invention provides novolak resins prepared with, relative to the total weight of phenolic monomers used in the preparation, 1-40 wt % of alkylphenols, e.g. 1-30 wt %, 1-20 wt %, or 5-20 wt %.

In one embodiment, the present invention provides novolak resins prepared by reacting:
 (a) 1-30 wt % of one or more alkylphenols (e.g. 1-25 wt %, 1-20 wt %, 5-20 wt %, or 5-15 25 wt %);
 (b) 1-25 wt % of resorcinol (e.g. 1-20 wt %, 5-20 wt %, or 5-15 wt %);
 (c) 45-98 wt % of phenol (e.g. 50-90 wt %, 60-90 wt %, 65-90 wt %, or 70-85 wt %); and
 (d) one or more aldehydes;
wherein said wt % are relative to the total weight of components (a), (b), and (c).

Alkylphenols are phenols having one or more alkyl group. Alkylphenols may have alkyl groups in the ortho, meta, and/or para positions of the phenol. In one embodiment, the alkylphenols include those having one alkyl group ("mono-alkylphenols"). In another embodiment, the alkylphenols include those having two alkyl groups ("di-alkylphenols").

In one embodiment, the alkyl groups of the alkylphenols have at least 4 carbon atoms, e.g. at least 8, at least 12, at least 16, at least 20, or at least 24 carbon atoms. Generally, the alkyl groups will comprise less than 60 carbon atoms, e.g. less than 40, less than 35, less than 30, or 28 or less carbon atoms.

Examples of the one or more aldehydes include formaldehyde, methylformcel, butylformcel, acetaldehyde, propionaldehde, butyraldehyde, crotonaldehyde, benzaldehyde, and firfural. In one embodiment, the one or more aldehydes include formaldehyde.

The present novolak resins may be prepared in any suitable manner. For instance, in one embodiment, non-resorcinol phenols are reacted first with one or more aldehydes in the presence of a catalyst (e.g. an acid catalyst, for instance a sulfonic acid catalyst such as p-toluene sulfonic acid or dodecyibenzensulfonic acid) to form a first resin. Resorcinol and optionally additional non-resorcinol phenols may then be added to the first resin, followed by the addition of additional aldehyde.

In one embodiment, the present novolak resins comprise less than 5 wt % free resorcinol, e.g. less than 3 wt %, less than 1 wt %, less than 0.5 wt %, or about 0 wt %.

In one embodiment, the present novolak resins are used in rubber compositions, i.e. compositions comprising one or more rubber compounds. Preferably, the rubber compositions are vulcanizable rubber compositions.

Examples of rubber compounds include both synthetic and natural rubbers. Representative synthetic rubbery polymers include the butadiene polymers. Butadiene polymers include those polymers having rubber-like properties which are prepared by polymerizing butadiene alone or with one or more other polymerizable ethylenically unsaturated compounds, such as styrene, methylstyrene, methyl isopropenyl ketone and acrylonitrile. Further examples of synthetic rubbers include neoprene rubbers. Isobutylene rubber (butyl) and ethylenepropylene rubber (EPDM) may also be employed.

In one embodiment, the weight ratio of the one or more rubber compounds to the novolak resin is in the range of 99:1 to 90:10, e.g. in the range of 99:1 to 95:5.

Also, the rubber composition may comprise a methylene donor. Suitable methylene donors include, for instance, hexamethylenetetramine (HMTA), di-, tri-, tetra-, penta-, or hexa-N-methylol-melamine or their partially or completely etherified or esterified derivatives, for example hexamethoxymethylmelamine (HMMM), oxazolidine or N-methyl-1,3,5-dioxazine.

The rubber composition of this invention may also include one or more additives, for instance additives selected from the group consisting of sulfur, carbon black, zinc oxide, silica, 5 anti-oxidant, stearates, accelerators, a cobalt, and adhesion promoters. In one embodiment the rubber composition is absent cobalt.

In one embodiment, the rubber composition further comprises a reinforcing material. Examples of reinforcing materials include nylon, rayon, polyester, aramid, glass, steel (brass, zinc or bronze plated) or other organic and inorganic compositions. These reinforcing materials 10 may be in the form of, for instance, filaments, fibers, cords or fabrics.

In one embodiment, the rubber composition comprises one or more oils. Suitable oils, include for instance mineral oils and naturally derived oils. Examples of naturally derived oils include, for instance, tall oil, linseed oil, and/or twig oil. Commercial examples of tall oil include, e.g., SYLFAT FA1 from Arizona Chemicals and PAMAK C4OS from Hercules Canada. In one embodiment, the rubber composition comprises, relative to the total weight of rubber compounds in the composition, less than 5 wt % of one or more oils, such as less than 2 wt %, less than 1 wt %, less than 0.6 wt %, less than 0.4 wt %, less than 0.3 wt %, or less than 0.2 wt %. In one embodiment, the rubber composition comprises, relative to the total weight of rubber compounds in the composition, at least 0.01 wt % of one or more oils, e.g. at least 0.05 wt % or at 20 least 0.1 wt %. The presence of an oil in the rubber composition may aid in providing improved flexibility of the rubber composition after vulcanization.

One aspect of the invention relates to a process for forming the rubber composition. In one embodiment, the process of forming the rubber composition comprises mixing one or more novolak resins (e.g., the above described novolak resins) with one or more oils (e.g., the above 25 described oils, such as the above-described naturally derived oils) to form a novolak resin-oil mixture, and mixing the novolak resin-oil mixture with one or more rubber compounds (e.g., one or more of the above-described rubber compounds). Pre-mixing the novolak resin and oil before combining them with the rubber compounds may result in better flexibility of the rubber composition after vulcanization and/or in a reduction of oil that needs to be used.

In one embodiment, the novolak resin-oil composition comprises, relative to the total weight of the composition, 0.5-20 wt % of one or more oils, e.g. 1-15 wt % or 2-10 wt %.

In one embodiment, the weight ratio of the one or more rubber compounds in the rubber composition to the novolak-oil composition is 99:1 to 80:20, e.g. 98:2 to 90:10.

The present rubber compositions are useful to make (parts op a wide variety of products, including, e.g., tires, hoses, power belts, conveyor belts, printing rolls, rubber shoe heels, rubber shoe soles, rubber wringers, automobile floor mats, mud flaps for trucks, ball mill liners, and weather strips. In one embodiment, the compositions are used to make wire belt skim coats.

In a preferred embodiment, the invention relates to a tire comprising a novolak resin that contains phenolic monomers, wherein 1-40 wt % of the phenolic monomers in the resin are alkylphenols. The novolak resin may contain (a) 1-30 wt % alkylphenols; (b) 1-25 wt % resorcinol; (e) 45-98 wt % phenol; and (d) one or more aldehydes; wherein the weight percentages are based on the total weight of components (a), (b), and (c). The alkyl groups in the alkylphenols may be one or more $C_4$-$C_{60}$ alkyl groups or one or more $C_{24}$-$C_{28}$ alkyl groups.

EXAMPLES

The following examples are given as particular embodiments of the invention and to demonstrate the practice and advantages thereof. It is to be understood that the examples are given by way of illustration and are not intended to limit the specification or the claims that follow in any manner.

Glossary

| Abbreviation | Ingredient (Supplier) |
| --- | --- |
| Rubber | natural rubber "SIR 10" (Astlett Rubber). |
| N-326 | carbon black (Degussa). |
| TMQ | trimethylquinone para phenylene antioxidant (Uniroyal). |
| 6 DDP | diamine antioxidant (Vanderbilt). |
| Cobalt | manobond680Cobalt (OM Group). |
| Crystex Sulfur | sulfur vulcanizing agent (Flexsys). |
| DCBS | dicyclobenothiazole sulfonamide (Flexsys). |
| HMMM | hexamethylmethoxyamine "Cyrez 963" (Cytec). |
| Tall oil | "Sylfat FA1" (Arizona Chemicals). |

Resin 1

355 g of a mixture of alkylphenols having alkyl groups in the range of about 24-28 carbon atoms (LCAP24-28 from Schenectady International), 974 g of phenol, and 14 g dodecylbenzene sulfonic acid (catalyst) were loaded in a flask and mixed while heating the flask to 90° C. 410 g of formaldehyde (50% aqueous solution) was then slowly added to the flask while keeping the temperature in the in the range of 90-100° C. After completion of the ensuing reaction, 355 g resorcinol and 1862 g phenol were added to the flask (90° C.). 520 g formaldehyde was then added slowly while maintaining the flask at 90° C. After completion of the ensuing reaction, 1,8 diazabicyclo (5,4,0) undecene-7 ("DBU") was added to neutralize the mixture in the flask. The water and unreacted phenol in the mixture were distilled off first at 170° C. and atmospheric pressure and then at 180° C. at 74 torr.

In the monomer feedstock, the weight percentages of the phenolic monomers in the monomer feedstock are approximately 10% LCAP24-28, 10% resorcinol, and 80% phenol, based on the total weight of the phenolic monomers. For the final product, the weight percentages of the phenolic monomers are approximately 20% LCAP24-28, 20% resorcinol, and 60% phenol, based on the total weight of the phenolic monomers.

Resin 2

600 g of para-t-butyl phenol ("pTBP"), 729 g of phenol, and 12 g dodecylbenzene sulfonic acid (catalyst) were loaded in a flask and mixed while heating the flask to 90° C. 441 g of formaldehyde (50% aqueous solution) was then slowly added to the flask while keeping the temperature in the in the range of 90-100° C. After completion of the ensuing reaction, 300 g resorcinol and 1380 g phenol were added to the flask (90° C.). 560 g formaldehyde was then added slowly while maintaining the flask at 90° C. After completion of the ensuing reaction, 6 g DBU was added to neutralize the mixture in the flask. The water and unreacted phenol in the mixture were distilled off first at 170° C. and atmospheric pressure and then at 180° C. at 74 torr.

The novolak resin obtained by this procedure was then melt-blended with 65 g Tall oil at a temperature in the range of 140° C.-160° C.

Resin 3

526 g of para-dodecyl phenol ("pDDP"), 1125 g of phenol, and 4 g dodecylbenzene sulfonic acid (catalyst) were loaded in a flask and mixed while heating the flask to 90° C. 450 g of formaldehyde (50% aqueous solution) was then slowly added to the flask while keeping the temperature in the in the range of 90-100° C. After completion of the ensuing reaction, 373 g resorcinol and 1687 g phenol were added to the flask (90° C.). 795 g formaldehyde was then added slowly while maintaining the flask at 90° C. After completion of the ensuing reaction, 2 g DBU was added to neutralize the mixture in the flask. The water and unreacted phenol in the mixture were distilled off first at 170° C. and atmospheric pressure and then at 180° C. at 74 torr.

The novolak resin obtained by this procedure was then melt-blended with 50 g Tall oil at a temperature in the range of 140° C.-160° C.

Resin 4

The preparation of Resin 3 was repeated except that 373 g pDDP was used instead of 15 526 g pDDP.

Resin 5

The preparation of Resin 1 was repeated. The thus obtained novolak resin was then melt-blended with 125 g Tall oil at a temperature in the range of 140° C.-160° C.

Resin 6

The preparation of Resin 3 was repeated except that 750 g pDDP was used instead of 526 g pDDP.

Resin 7

The preparation of Resin 1 was repeated. The thus obtained novolak resin was then melt-blended with 65 g Tall oil at a temperature in the range of 140° C.-160° C.

Resin 8

The preparation of Resin I was repeated except that the amount of resorcinol and LCAP24-28 monomers were altered so that the weight percentage of the phenolic monomers in the monomer feedstock are 15% LCAP24-28, 5% resorcinol, and 80% phenol, based on the total weight of the phenolic monomers.

Resin A

Resin A is a commercial resorcinol-formaldehyde resin containing about 20-25% free resorcinol ("B18S" from Indspec). The resin is produced by reacting formaldehyde with resorcinol and distilling off the water.

Resin B

Resin B is a commercial phenol/formaldehyde novolak resin with cashew nut oil reacted onto the backbone ("HRI-11995" from Schenectady International).

Resin C

Resin C is a commercial resorcinol-formaldehyde resin similar to Resin A, but containing between 10-16% free resorcinol ("B19S" from Indspec).

Resin D

Resin D is a commercial resorcinol-formaldehyde resin containing low amounts of free resorcinol ('MOS" from Indspec). When making Resin D, styrene is reacted into the resin to scavenge free monomers.

Rubber compositions were prepared for each of Resins 3-8 and A-D by compounding the following components:

| Ingredient | Amount (pbw) |
| --- | --- |
| One of Resins 3-8, A-D | 3 |
| Rubber | 100 |
| N-326 | 55 |
| Zinc Oxide | 8 |
| Stearic Acid | 1 |
| TMQ | 1 |
| 6 DDP | 2 |
| Cobalt | 0.5 |
| Crystex Sulfur | 5 |
| DCBS | 0.8 |
| HMMM | 3 |

The rubber compositions in the following tables are numbered in accordance with the Resin they comprise (e.g., "Comp. 3" or "Composition 3" refers to the rubber composition comprising Resin 3).

The first set of data tests Compositions 3-7 against Comparative Compositions A and B (see infra for test methods), with the results set forth in the following Table.

| | Comp. 3 | Comp. 4 | Comp. 5 | Comp. 6 | Comp. 7 | Comp. A | Comp. B |
| --- | --- | --- | --- | --- | --- | --- | --- |
| Mooney Viscosity | | | | | | | |
| initial | 95.4 | 88.3 | 88.5 | 91.4 | 83.4 | 85.5 | 89.8 |
| at 4 min. | 75.1 | 67.4 | 67.8 | 75.4 | 67.5 | 69.4 | 69.1 |
| ODR Cure | | | | | | | |
| t1 | 2.4 | 2.8 | 2.9 | 2.5 | 2.8 | 2.8 | 2.8 |
| t90 | 7.7 | 8.7 | 8.8 | 7.8 | 8.8 | 8.3 | 8.8 |
| Wire Adhesion | | | | | | | |
| Peak load original | 154 | 156 | 143 | 158 | 150 | 154 | 148 |
| Peak load aged | 165 | 150 | 152 | 165 | 154 | 155 | 143 |
| humidity aged (21 days) | 154 | 137 | 140 | 154 | 129 | 132 | 144 |
| salt bath aged (96 hrs) | 130 | 128 | 111 | 127 | 104 | 118 | 118 |

-continued

|  | Comp. 3 | Comp. 4 | Comp. 5 | Comp. 6 | Comp. 7 | Comp. A | Comp. B |
| --- | --- | --- | --- | --- | --- | --- | --- |
| Hardness |  |  |  |  |  |  |  |
| Shore A Room Temp. | 85 | 80 | 78 | 87 | 80 | 77 | 80 |
| Shore A 100° C. | 89 | 84 | 82 | 91 | 83 | 80 | 83 |
| Rubber to Rubber Adhesion | 61 | 127 | 170 | 56 | 208 | 138 | 158 |

Test Methods:

Mooney Viscosity

The Mooney viscosity was determined in accordance with ASTM D 1646-00, which method is hereby incorporated in its entirety by reference.

ODR Cure

ODR cure data was determined in accordance with ASTM 2085-01, which method is hereby incorporated in its entirety by reference. t1="time to cure for 1%" of the cure (minutes). t90 is "time to cure for 90%" of the cure (minutes).

Wire Adhesion

Wire adhesion data was determined in accordance with ASTM D2229-99, which method is hereby incorporated in its entirety by reference.

Hardness

Hardness data was determined in accordance with ASTM D412-98a & D2240-02, which methods are hereby incorporated in their entirety by reference.

Rubber to Rubber Adhesion

Rubber to rubber adhesion data was determined in accordance with ASTM D413-98, which method is hereby incorporated in its entirety by reference.

Next, Resins 1, 5, and 8 (as Compositions 1, 5, and 8) were tested against Resins A, C, and D (as Compositions A, C, and D) in the following tests: cure rate, hardness, tensile strength, elongation, elasticity, adhesion, flexibility, resistance, and viscosity. A "blank" composition, which contains all the components of the composition except for the resin, was also included with each of these tests. As known by those of skill in the art, a composition without a resin component will deteriorate at high temperatures, and is therefore unacceptable for use in products under high-temperature conditions, such as commercial-grade tires. The blank was used in these examples as a reference.

The following tests were performed by Akron Rubber Development Laboratory, Inc. of 2887 Gilchrist Road, Akron, Ohio.

The first test parameter is ODR (Oscillating Disk Rheometry). This is a cure rate test with two different rates, cure and scorch. Cure is the total cure time to a specified cure state, and scorch is a measure of through cure, which relates to the cure rate between the center of the composition and the outside of the composition. The cure rates are tested in accordance with ASTM D 2084-01 using a Tech Pro rheoTECH ODR. at 148.9° C. (300° F.), 3° arc, 100 inch lbs (torque range), 60 minute chart, and 1.7 Hz.

The chart depicted in FIG. 1 shows that Compositions 1, 5, and 8 all have faster cures than Comparative Composition D. As the difference between 23 and 25 minutes is not that significant in the filed of tire manufacturing, Compositions 1, 5, and 8 all have acceptable cure rates. All the compositions also have acceptable scorch numbers.

Figure 2:
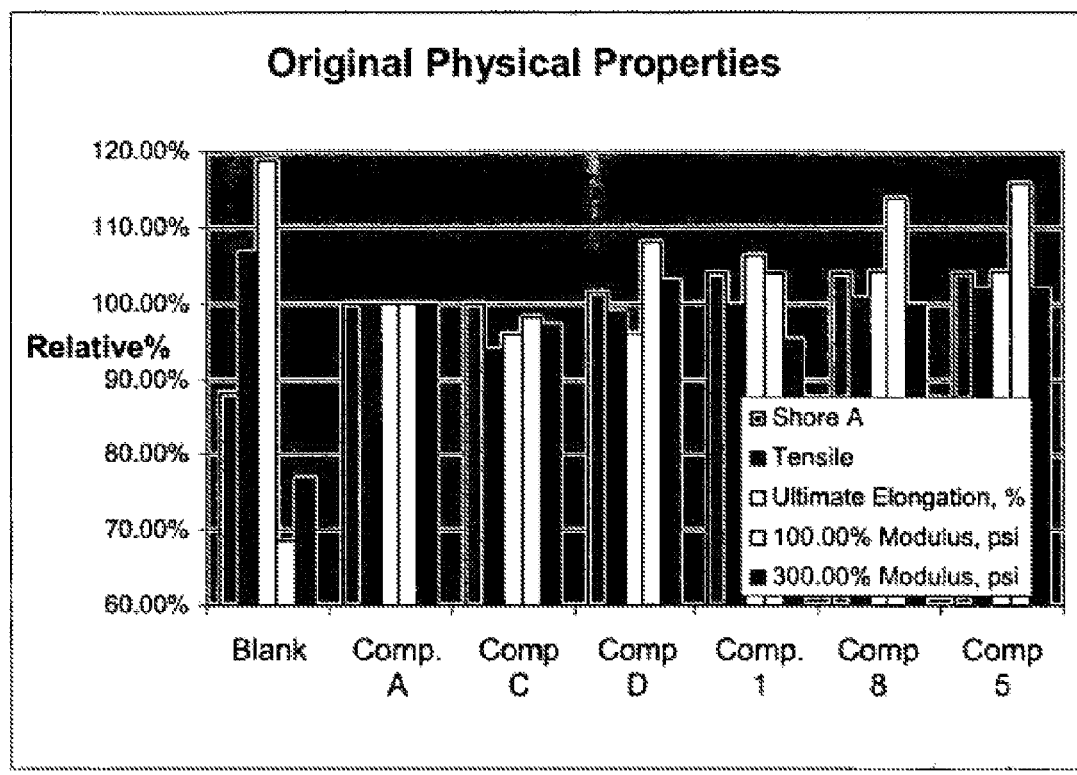
FIG. 2 depicts a chart of Original Physical Properties test results analyzing compositions 1, 5, 8, A, C, and D.

In the original physical properties chart depicted in FIG. 2, the shore A durometer, tensile strength, ultimate elongation, 100% modulus, and 300% modulus were measured for the seven compositions. The properties were tested on a cured piece of rubber to characterize the strength of the cure. The physical properties are measured in accordance with ASTM D 412-98a(02) and D 2240-02b, with the Die C dumbbells tested at 20 in/min. The measurements for Composition A are normalized to 100%, and the values for the other compositions are adjusted accordingly. The chart depicted in FIG. 2 shows that Compositions 1, 5, and 8 generally perform better (higher tensile strength, better elongation, and better stress) than Comparative Compositions A, C, and D.

Figure 3:
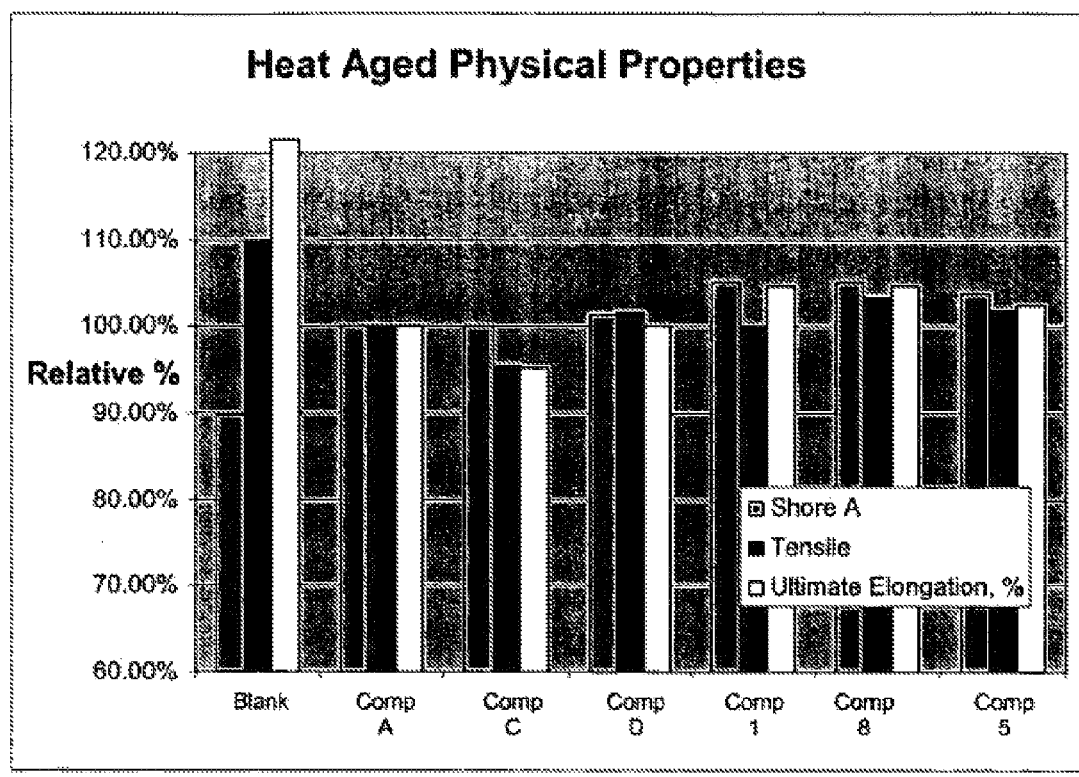
FIG. 3 depicts a chart of Heat Aged Physical Properties test results analyzing compositions 1, 5, 8, A, C, and D.

The heat aged test measures shore A durometer, tensile strength, and elongation under heat aged conditions. This test was measured in accordance with ASTM D 573-99, with specimens aged 72 hours at 158° F. in a forced air oven. The measurements for Composition A are normalized to 100%, and the values for the other compositions are adjusted accordingly. As seen from the chart depicted in FIG. 3, Compositions 1, 5, and 8 performed better than Comparative Compositions A, C, and D.

Adhesion is an indicator of how well the resin in the composition will assist the rubber in binding to steel belts in a tire. Adhesion may be measured as adhesion to a flexible substrate or as wire adhesion, either at room temperature (76° F.) (wire adhesion original) or 21 days at 176° F., 98% RH (wire adhesion aged). Adhesion to a flexible substrate is measured in accordance with. ASTM D 413-98(02), with 0.25-inch wide specimens tested at 2 in/min. The average of the peaks was reported. Both wire adhesion tests were measured in accordance with ASTM D 2229-02, with specimens tested at 2 in/min and pulled from a 0.5-inch block of rubber. The average of 15 specimens was reported. For all three tests, the measurements for Composition A are normalized to 100%, and the values for the other compositions are adjusted accordingly.

Figure 4:
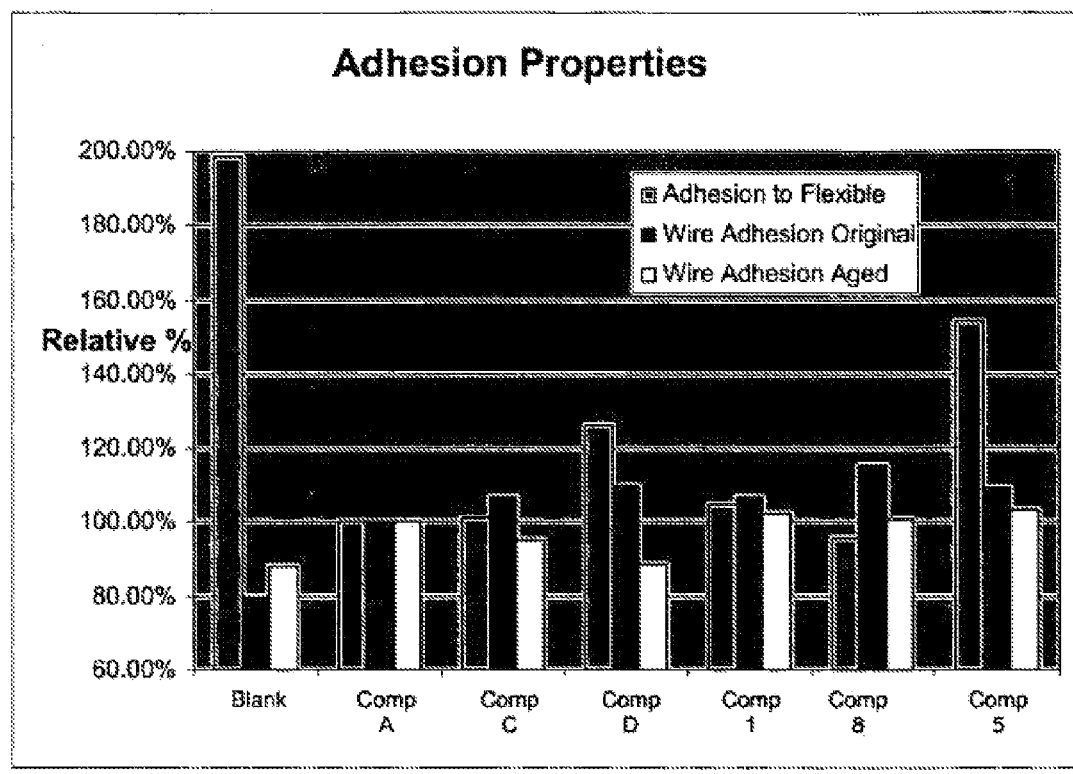
FIG. 4 depicts a chart of Adhesion Properties test results analyzing compositions 1, 5, 8, A, C, and D.

The graph depicted in FIG. 4 shows that the flexible adhesion of Composition 5 is far superior to Comparative Compositions A, C, and D. The wire adhesions of Compositions 1, 5, and 8 are on par or better than those of Comparative Compositions A, C, and D.

Figure 5:
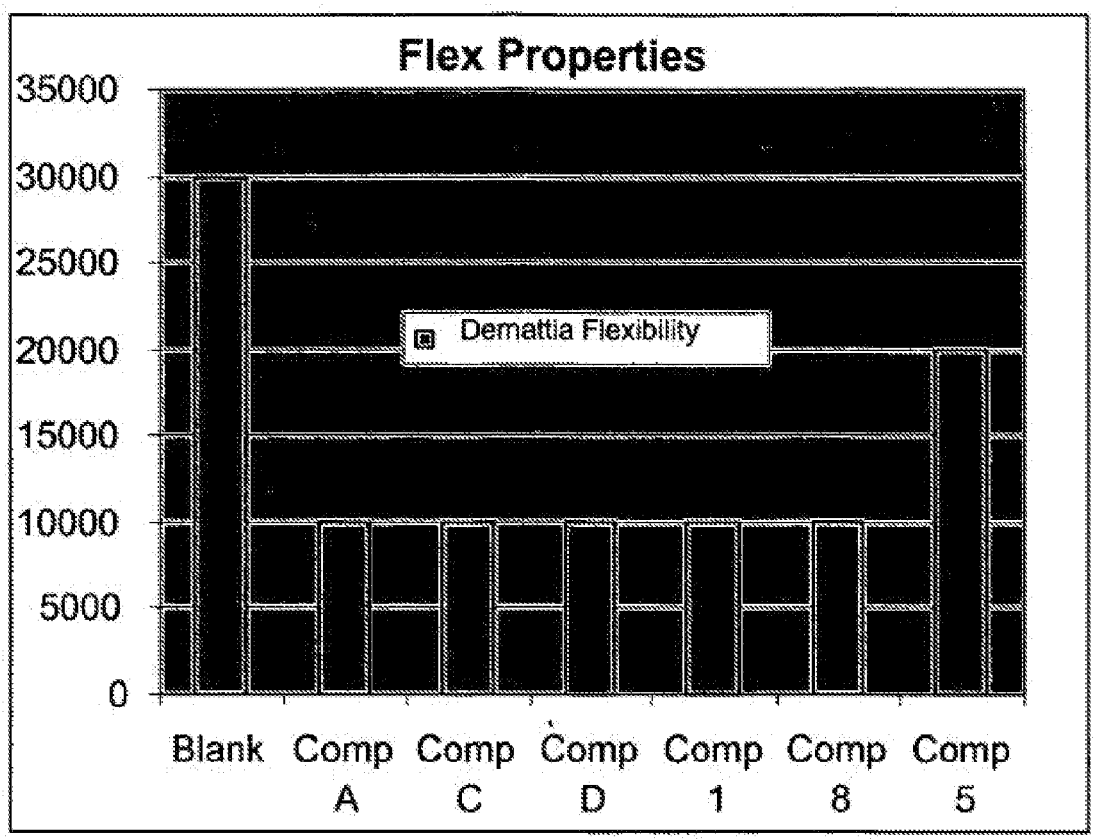
FIG. 5 depicts a chart of Flex Properties test results test results analyzing compositions 1, 5, 8, A, C, and D.

Demattia flexibility is an indication of rubber stiffness/flexibility in the cure. The Demattia flexibility test attempts to imitate the impact a tire receives upon hitting a bump in the road. The tests were measured in accordance with ASTM D 813-95(O), with pierced specimens tested at 300 cpm. As shown in the chart depicted in FIG. 5, Compositions 1 and 8 performed equal to Comparative Compositions A, C, and D, while Composition 5 outperformed Comparative Compositions A, C, and D.

Figure 6:
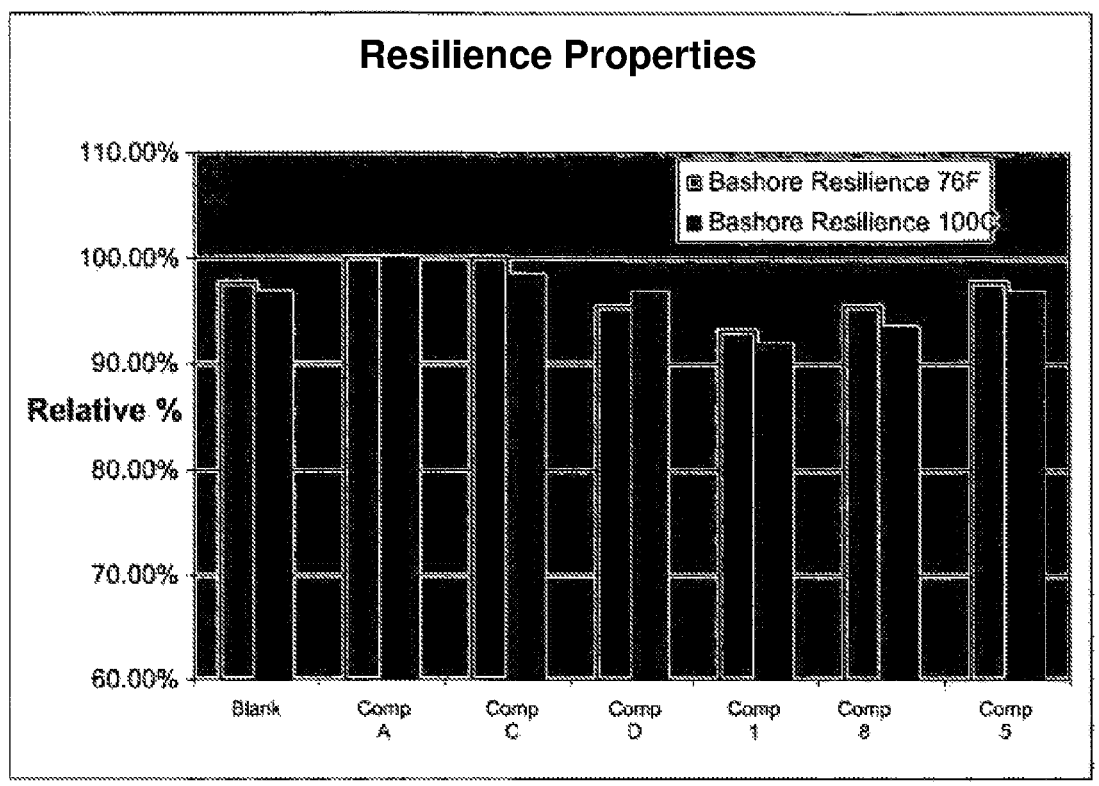
FIG. 6 depicts a chart of Resilience Properties test results analyzing compositions 1, 5, 8, A, C, and D.

Resilience to rebound measures a composition's ability to absorb energy and release the energy as heat. The higher a resilience percentage, the better a composition is able to absorb and release the energy. Bashore resilience is measured at room temperature (76° F.) and room temperature immediately after 30 minutes conditioning at 212° F. (100° C.). Both tests are run in accordance with ASTM D 2632-88, with a 16-inch drop height. The measurements for Composition A are normalized to 100%, and the values for the other compositions are adjusted accordingly. The chart depicted in FIG. 6 shows that Composition 5 has a better resilience to rebound than Comparative Composition D, while Compositions 1 and 8 are on par with Comparative Composition D.

Figure 7:
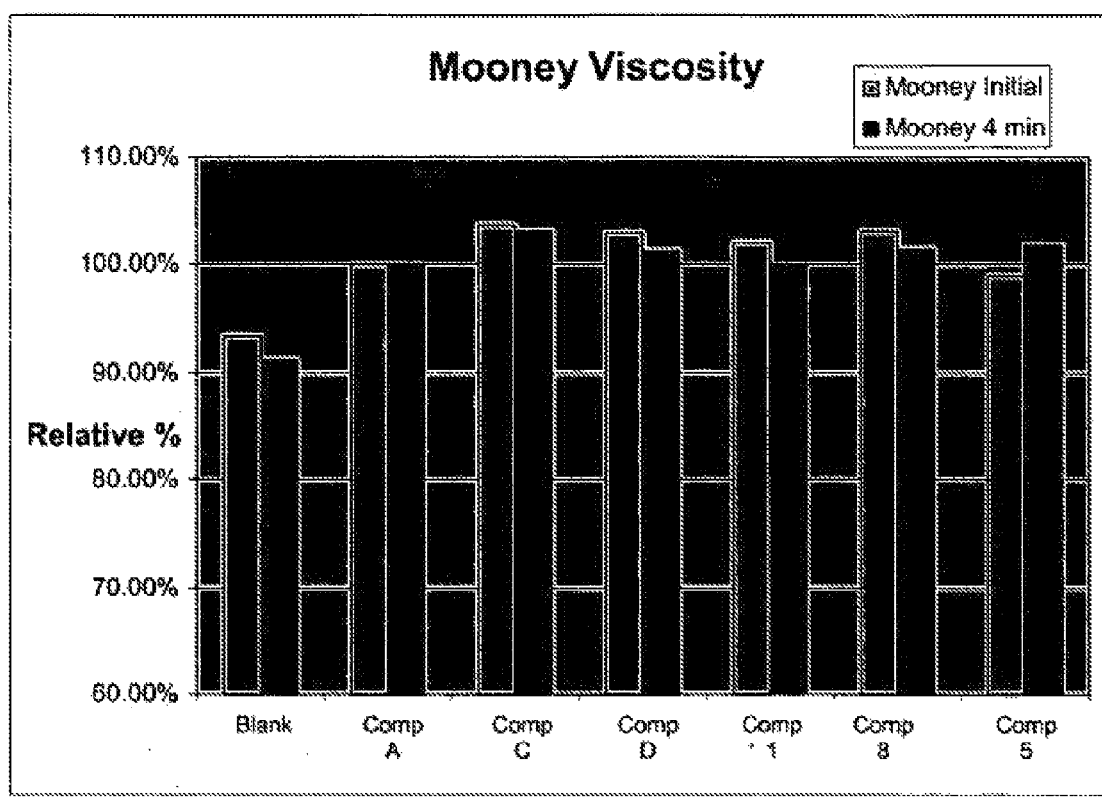
FIG. 7 depicts a chart of Mooney Viscosity test results analyzing compositions 1, 5, 8, A, C, and D.

Mooney viscosity attempts to measure the ability of a rubber composition to be processed by, for example, a manufacturer. The lower the viscosity of the composition, the easier that compositions is to process. Mooney viscosity is measured in accordance with ASTM D 1646-00 with an Alpha Technologies MV2000 viscometer, with CML 1+4 at 100° C. (212° F.). Measurements were taken initially and at four minutes. The measurements for Composition A are normalized to 100%, and the values for the other compositions are adjusted accordingly. The graph depicted in FIG. 7 shows that Compositions 1, 5, and 8 are very similar in processing viscosity as compared to Comparative Compositions A, C, and D.

In conclusion, the cumulative data confirm that Compositions 1, 5, and 8 (made from Resins 1, 5, and 8) are viable alternatives for the current commercial embodiments shown in Compositions A, C, and D (made from Resins A, C, and D), performing as well or better in the tests associated with evaluating the performance of resorcinol and resorcinol resins.

Having described specific embodiments of the present invention, it will be understood that many modifications thereof will readily be apparent to those skilled in the art, and it is intended therefore that this invention is limited only by the spirit and scope of the following claims.

What is claimed is:

1. A novolak resin comprising phenolic monomers, wherein 1-40 wt % of the phenolic monomers are alkylphenols having a $C_8$-$C_{60}$ alkyl group, wherein one or more of the alkyl groups in the alkylphenols is a $C_{20}$-$C_{30}$ alkyl group.

2. The novolak resin of claim 1, further comprising resorcinol.

3. The novolak resin of claim 1, further comprising phenol.

4. The novolak resin of claim 1, wherein one or more of the alkyl groups in the alkylphenols is a $C_{24}$-$C_{28}$ alkyl group.

5. The novolak resin of claim 1, further comprising one or more aldehydes.

6. The novolak resin of claim 5, wherein one or more of the aldehydes is formaldehyde.

7. The novolak resin of claim 1, wherein the resin comprises:
   (a) 1-30 wt % alkylphenols;
   (b) 1-20 wt % resorcinol;
   (c) 45-98 wt % phenol; and
   (d) one or more aldehydes;
wherein the weight percentages are based on the total weight of components (a), (b), and (c).

8. The novolak resin of claim 7, wherein the resin comprises:
   (a) 5-20 wt % alkylphenols;
   (b) 5-20 wt % of resorcinol;
   (c) 65-90 wt % of phenol; and
   (d) one or more aldehydes;
wherein the weight percentages are based on the total weight of components (a), (b), and (c).

9. The novolak resin of claim 8, wherein the resin comprises:
   (a) 5-15 wt % alkylphenols;
   (b) 5-15 wt % resorcinol;
   (c) 70-90 wt % phenol; and
   (d) formaldehyde;
wherein the weight percentages are based on the total weight of components (a), (b), and (c).

10. A composition comprising one or more rubber compounds and the novolak resin according to claim 1.

11. The composition of claim 10, wherein the weight ratio of said one or more rubber compounds to said novolak resin ranges from about 99:1 to about 9:1.

12. A product prepared at least in part by vulcanizing the composition of claim 10.

13. The product of claim 12, wherein said product is selected from the group consisting of tires, hoses, power belts, conveyor belts, printing rolls, rubber shoe heels, rubber shoe soles, rubber wringers, automobile floor mats, mud flaps for trucks, ball mill liners, and weather strips.

14. The product of claim 12, wherein said product is a wire belt skim coat.

15. A tire comprising a novolak resin that contains phenolic monomers, wherein 1-40 wt % of the phenolic monomers in the resin are alkylphenols having a $C_8$-$C_{60}$ alkyl group, wherein one or more of the alkyl groups in the alkylphenols is a $C_{20}$-$C_{30}$ alkyl group.

16. The tire of claim 15, wherein one or more of the alkyl groups in the alkylphenols is a $C_{24}$-$C_{28}$ alkyl group.

17. The tire of claim 15, wherein the resin comprises:
   (a) 1-30 wt % alkylphenols;
   (b) 1-25 wt % resorcinol;
   (c) 45-98 wt % phenol; and
   (d) one or more aldehydes;
wherein the weight percentages are based on the total weight of components (a), (b), and (c).

18. The tire of claim 17, wherein the resin comprises:
   (a) 5-20 wt % alkylphenols;
   (b) 5-20 wt % of resorcinol;
   (c) 65-90 wt % of phenol; and
   (d) one or more aldehydes;
wherein the weight percentages are based on the total weight of components (a), (b), and (c).

19. The tire of claim 18, wherein the resin comprises:
   (a) 5-15 wt % alkylphenols;
   (b) 5-15 wt % resorcinol;
   (c) 70-90 wt % phenol; and
   (d) formaldehyde;
wherein the weight percentages are based on the total weight of components (a), (b), and (c).

* * * * *